(12) United States Patent
Zalewski et al.

(10) Patent No.: US 9,108,108 B2
(45) Date of Patent: Aug. 18, 2015

(54) REAL-TIME, CONTEXTUAL DISPLAY OF RANKED, USER-GENERATED GAME PLAY ADVICE

(75) Inventors: Gary M. Zalewski, Foster City, CA (US); Sean Turner, Foster City, CA (US)

(73) Assignees: Sony Computer Entertainment America LLC, San Mateo, CA (US); Sony Computer Entertainment Europe Ltd., London (GB)

( * ) Notice: Subject to any disclaimer, the term of this patent is extended or adjusted under 35 U.S.C. 154(b) by 1704 days.

(21) Appl. No.: 12/509,848

(22) Filed: Jul. 27, 2009

(65) Prior Publication Data
US 2010/0041475 A1 Feb. 18, 2010

Related U.S. Application Data

(63) Continuation-in-part of application No. 11/850,516, filed on Sep. 5, 2007.

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |
| A63F 13/30 | (2014.01) | |

(52) U.S. Cl.
CPC ........... *A63F 13/12* (2013.01); *A63F 2300/305* (2013.01); *A63F 2300/558* (2013.01); *A63F 2300/572* (2013.01)

(58) Field of Classification Search
USPC ................................................. 463/9, 42, 31
See application file for complete search history.

(56) References Cited

U.S. PATENT DOCUMENTS

| | | | |
|---|---|---|---|
| 3,147,341 A | 9/1964 | Gibson, Jr. | |
| 3,200,193 A | 8/1965 | Biggs et al. | |
| 4,016,540 A | 4/1977 | Hyatt | |
| 4,090,216 A | 5/1978 | Constable | |
| 4,104,625 A | 8/1978 | Bristow et al. | |
| 4,355,334 A | 10/1982 | Fitzgibbon et al. | |
| 4,445,187 A | 4/1984 | Best | |
| 4,475,132 A | 10/1984 | Rodesch | |

(Continued)

FOREIGN PATENT DOCUMENTS

| | | |
|---|---|---|
| CN | 1201180 A | 12/1998 |
| CN | 18385783 | 12/2002 |

(Continued)

OTHER PUBLICATIONS

Chaudhuri, Surajit, et al., "Probabilistic Information Retrieval Approach for Ranking of Databased Query Results," 2006.

(Continued)

*Primary Examiner* — Reginald Renwick
(74) *Attorney, Agent, or Firm* — Carr & Ferrell LLP

(57) ABSTRACT

Management of user-generated and context appropriate game play advice is disclosed. The present invention allows for management of context appropriate game play advice that is complete and up-to-date regardless of when a particular interactive gaming title is released. Game play advice is pervasive and easily accessible to game players in addition to being accurate and credible such that game players can trust or rely upon the rendered advice. The game play advice is displayed in environmental contexts that are appropriate to the advice being displayed.

16 Claims, 7 Drawing Sheets

(56) References Cited

U.S. PATENT DOCUMENTS

| | | |
|---|---|---|
| 4,514,727 A | 4/1985 | Van Antwerp |
| 4,569,026 A | 2/1986 | Best |
| 4,677,569 A | 6/1987 | Nakano et al. |
| 4,704,696 A | 11/1987 | Reimer et al. |
| 4,752,069 A | 6/1988 | Okada |
| 4,757,525 A | 7/1988 | Matthews et al. |
| 4,952,917 A | 8/1990 | Yabuuchi |
| 5,057,744 A | 10/1991 | Barbier et al. |
| 5,167,010 A | 11/1992 | Elm et al. |
| 5,241,671 A | 8/1993 | Reed et al. |
| 5,274,560 A | 12/1993 | LaRue |
| 5,321,833 A | 6/1994 | Chang et al. |
| 5,358,259 A | 10/1994 | Best |
| 5,377,997 A | 1/1995 | Wilden et al. |
| 5,405,152 A | 4/1995 | Katanics et al. |
| 5,446,714 A | 8/1995 | Yoshio et al. |
| 5,498,002 A | 3/1996 | Gechter |
| RE35,314 E | 8/1996 | Logg |
| 5,598,297 A | 1/1997 | Yamanaka et al. |
| 5,617,407 A | 4/1997 | Bareis |
| 5,649,861 A | 7/1997 | Okano et al. |
| 5,659,732 A | 8/1997 | Kirsch |
| 5,704,837 A | 1/1998 | Iwasaki et al. |
| 5,724,567 A | 3/1998 | Rose et al. |
| 5,732,232 A | 3/1998 | Brush, II et al. |
| 5,765,150 A | 6/1998 | Burrows |
| 5,786,801 A | 7/1998 | Ichise |
| 5,802,361 A | 9/1998 | Wang et al. |
| 5,818,553 A | 10/1998 | Koenck et al. |
| 5,823,879 A | 10/1998 | Goldberg et al. |
| 5,870,740 A | 2/1999 | Rose et al. |
| 5,890,122 A | 3/1999 | Van Kleeck et al. |
| 5,947,823 A | 9/1999 | Nimura |
| 5,948,040 A | 9/1999 | DeLorme et al. |
| 5,974,412 A | 10/1999 | Hazlehurst et al. |
| 5,977,968 A | 11/1999 | Le Blanc |
| 6,001,013 A | 12/1999 | Ota |
| 6,012,053 A | 1/2000 | Pant et al. |
| 6,017,272 A | 1/2000 | Rieder |
| 6,067,539 A | 5/2000 | Cohen |
| 6,098,061 A | 8/2000 | Gotoh et al. |
| 6,155,924 A | 12/2000 | Nakagawa et al. |
| 6,168,524 B1 | 1/2001 | Aoki et al. |
| 6,183,366 B1 | 2/2001 | Goldberg et al. |
| 6,202,058 B1 | 3/2001 | Rose et al. |
| 6,210,273 B1 | 4/2001 | Matsuno |
| 6,264,560 B1 | 7/2001 | Goldberg et al. |
| 6,273,818 B1 | 8/2001 | Komoto |
| 6,283,861 B1 | 9/2001 | Kawai et al. |
| 6,296,570 B1 | 10/2001 | Miyamoto et al. |
| 6,319,121 B1 | 11/2001 | Yamada et al. |
| 6,327,590 B1 | 12/2001 | Chidlovskii et al. |
| 6,363,378 B1 | 3/2002 | Conklin et al. |
| 6,366,272 B1 | 4/2002 | Rosenberg et al. |
| 6,375,571 B1 | 4/2002 | Ohnuma et al. |
| 6,409,604 B1 | 6/2002 | Matsuno |
| 6,413,163 B1 | 7/2002 | Yamauchi et al. |
| 6,419,580 B1 | 7/2002 | Ito |
| 6,428,411 B1 | 8/2002 | Togami |
| 6,434,556 B1 | 8/2002 | Levin et al. |
| 6,456,977 B1 | 9/2002 | Wang |
| 6,508,706 B2 | 1/2003 | Sitrick et al. |
| 6,529,875 B1 | 3/2003 | Nakajima et al. |
| 6,533,663 B1 | 3/2003 | Iwao et al. |
| 6,538,666 B1 | 3/2003 | Ozawa et al. |
| 6,554,707 B1 | 4/2003 | Sinclair et al. |
| 6,556,983 B1 | 4/2003 | Altschuler et al. |
| 6,571,208 B1 | 5/2003 | Kuhn et al. |
| 6,572,478 B2 | 6/2003 | Miyamoto et al. |
| 6,582,230 B1 * | 6/2003 | Aoshima et al. ............... 434/118 |
| 6,582,309 B2 | 6/2003 | Higurashi et al. |
| 6,585,599 B1 | 7/2003 | Horigami et al. |
| 6,652,384 B2 | 11/2003 | Kondo et al. |
| 6,684,127 B2 | 1/2004 | Fujita et al. |
| 6,705,945 B2 | 3/2004 | Gavin et al. |
| 6,729,954 B2 | 5/2004 | Atsumi et al. |
| 6,899,628 B2 | 5/2005 | Leen et al. |
| 6,920,426 B2 | 7/2005 | Takechi |
| 6,928,433 B2 | 8/2005 | Goodman et al. |
| 6,935,954 B2 | 8/2005 | Sterchi et al. |
| 6,966,832 B2 | 11/2005 | Leen et al. |
| 6,979,267 B2 | 12/2005 | Leen et al. |
| 7,029,394 B2 | 4/2006 | Leen et al. |
| 7,062,561 B1 | 6/2006 | Reisman |
| 7,085,722 B2 | 8/2006 | Luisi |
| 7,137,891 B2 | 11/2006 | Neveu et al. |
| 7,155,157 B2 | 12/2006 | Kaplan |
| 7,172,118 B2 | 2/2007 | Urken |
| 7,180,529 B2 | 2/2007 | Covannon et al. |
| 7,233,904 B2 | 6/2007 | Luisi |
| 7,438,642 B2 | 10/2008 | Walker et al. |
| 7,452,273 B2 * | 11/2008 | Amaitis et al. ............... 463/22 |
| 7,455,589 B2 | 11/2008 | Neveu et al. |
| 7,572,187 B2 | 8/2009 | Van Luchene |
| 7,613,616 B2 | 11/2009 | Luisi |
| 7,717,782 B2 * | 5/2010 | Van Luchene ............... 463/9 |
| 7,731,589 B2 | 6/2010 | Kataoka et al. |
| 7,946,909 B2 | 5/2011 | Neveu et al. |
| 7,965,859 B2 | 6/2011 | Marks |
| 8,714,983 B2 | 5/2014 | Kil |
| 2001/0009867 A1 | 7/2001 | Sakaguchi et al. |
| 2002/0068626 A1 | 6/2002 | Takeda et al. |
| 2002/0082065 A1 | 6/2002 | Fogel et al. |
| 2002/0103031 A1 | 8/2002 | Neveu et al. |
| 2002/0169617 A1 | 11/2002 | Luisi |
| 2003/0109305 A1 | 6/2003 | Gavin et al. |
| 2004/0029625 A1 | 2/2004 | Annunziata |
| 2004/0166935 A1 | 8/2004 | Gavin et al. |
| 2006/0039017 A1 | 2/2006 | Park et al. |
| 2006/0178179 A1 | 8/2006 | Neveu et al. |
| 2006/0190270 A1 | 8/2006 | Luisi |
| 2007/0060231 A1 | 3/2007 | Neveu et al. |
| 2007/0087797 A1 | 4/2007 | Van Luchene |
| 2007/0244704 A1 | 10/2007 | Luisi |
| 2007/0257928 A1 | 11/2007 | Marks et al. |
| 2007/0279427 A1 | 12/2007 | Marks |
| 2008/0064019 A1 | 3/2008 | Kaufman et al. |
| 2008/0109491 A1 | 5/2008 | Gupta |
| 2009/0063463 A1 | 3/2009 | Turner et al. |
| 2010/0041475 A1 | 2/2010 | Zalewski et al. |
| 2010/0111374 A1 | 5/2010 | Stoica |
| 2010/0171430 A1 | 7/2010 | Seydoux |
| 2010/0213873 A1 | 8/2010 | Picard et al. |
| 2010/0312366 A1 | 12/2010 | Madonna et al. |
| 2014/0121009 A1 | 5/2014 | Watson |

FOREIGN PATENT DOCUMENTS

| | | |
|---|---|---|
| CN | 1848742 | 1/2005 |
| CN | 101968827 | 2/2011 |
| CN | ZL201010245413.8 | 5/2014 |
| DE | 19905076 | 5/2000 |
| DE | 1262955 | 3/2010 |
| EP | 789296 | 8/1997 |
| EP | 850673 | 7/1998 |
| EP | 0898237 | 2/1999 |
| EP | 0901803 | 3/1999 |
| EP | 913175 | 5/1999 |
| EP | 1029569 | 8/2000 |
| EP | 1078661 | 2/2001 |
| EP | 1262955 | 12/2002 |
| EP | 1355707 | 10/2003 |
| EP | 1388357 | 2/2004 |
| EP | 1434627 | 7/2004 |
| EP | 1630754 A1 | 3/2006 |
| EP | 1650706 A1 | 4/2006 |
| EP | 1793588 | 6/2007 |
| EP | 1262955 | 3/2010 |
| EP | 2322257 | 5/2011 |
| FR | 1262955 | 3/2010 |
| GB | 2355627 | 9/1998 |
| GB | 2351637 | 1/2001 |
| GB | 2356785 | 5/2001 |
| GB | 2411065 A | 8/2005 |

(56) References Cited

FOREIGN PATENT DOCUMENTS

| | | |
|---|---|---|
| GB | 1262955 | 3/2010 |
| JP | 59202779 | 11/1984 |
| JP | 7178246 | 7/1995 |
| JP | H08-155140 | 6/1996 |
| JP | 9265379 | 10/1997 |
| JP | H10-272258 | 10/1998 |
| JP | H10-295935 | 11/1998 |
| JP | H11-000467 | 1/1999 |
| JP | 11070273 | 3/1999 |
| JP | H11-119791 | 4/1999 |
| JP | 11197359 | 7/1999 |
| JP | 2000-024322 | 1/2000 |
| JP | 2000-116946 | 4/2000 |
| JP | 2000-176154 | 6/2000 |
| JP | 2000-334168 | 12/2000 |
| JP | 2001009156 | 1/2001 |
| JP | 2001029649 | 2/2001 |
| JP | 2001-079265 | 3/2001 |
| JP | 2001-157779 | 6/2001 |
| JP | 2001-198350 | 7/2001 |
| JP | 2002-052256 | 2/2002 |
| JP | 2002-085835 | 3/2002 |
| JP | 2002-092474 | 3/2002 |
| JP | 2002-159740 | 6/2002 |
| JP | 2002-166048 | 6/2002 |
| JP | 2002-191868 | 7/2002 |
| JP | 2003-047768 | 2/2003 |
| JP | 2003-228585 | 8/2003 |
| JP | 2004-529678 | 9/2004 |
| JP | 2005-505357 | 2/2005 |
| JP | 3741687 | 11/2005 |
| JP | 2006-031670 | 2/2006 |
| JP | 2006-099125 | 4/2006 |
| JP | 3865721 | 10/2006 |
| JP | 2007-249899 | 9/2007 |
| JP | 2006-087459 | 9/2008 |
| JP | 2011-025044 | 2/2011 |
| KR | 200072753 | 12/2000 |
| KR | 0464877 | 12/2004 |
| KR | 10-0469822 | 6/2005 |
| KR | 10-2002-0044919 | 7/2005 |
| KR | 10-2007-0052493 | 9/2008 |
| KR | 10-1226305 | 1/2013 |
| WO | 9418790 | 8/1994 |
| WO | 9714102 | 4/1997 |
| WO | 0182626 A1 | 11/2001 |
| WO | 0260548 | 8/2002 |
| WO | 03031003 | 4/2003 |
| WO | 2005040900 | 5/2005 |
| WO | 2006033360 A1 | 3/2006 |
| WO | 2007130641 | 11/2007 |
| WO | 2009052659 | 4/2009 |
| WO | 2009060376 | 5/2009 |
| WO | 2014070677 | 5/2014 |

OTHER PUBLICATIONS

Agichtein, Eugene, et al., "Improving Web Search Ranking by Incorporating User Behavior Information," SIGIR '06, Aug. 6-11, 2006, ACM.
Agarwal, Ganesh, et al., "Ranking Database Queries Using User Feedback: A Neural Network Approach," CS511 Project, Advanced Database Management Systems, Fall 2006.
Chidlovskii, Boris, et al., "Collaborative Re-Ranking of Search Results," Xerox Research Centre Europe, AAAI-2000, Workshop on AI for Web Search, 2001.
Kang, Jaewoo, et al., "Establishing Value Mappings Using Statistical Models and User Feedback," CIKM '05, Oct. 31-Nov. 5, 2005, 2005, ACM.
Bhattacharjee, Rajat, et al., "Incentive Based Ranking Mechanisms," Position Paper, Department of Computer Science, Stanford University, 2006.

"W3C Working Draft Jun. 18, 2007," the XMLHttpRequest Object, W3C, http://www.w3.org/TR/2007/WD-XMLHttpRequest-20070618/.
Internet.com, "Graphical User Interface," available at http://www.webopedia.com; accessed Sep. 24, 2004. Last Modified May 17, 2004.
Screen Shot of a Civilization Building Game; Available at http://www.s2.com.br/s2arquivos/361/Imagens/2323Image.jpg (accessed Oct. 11, 2005).
Screen Shot of a Civilization Building Game; Available at http://www.s2.com.br/s2arquivos/361/Imagens/2324Image.jpg (accessed Oct. 11, 2005).
Screen Shot of a Flight Simulator; Available at http://foto.spullenbank.nl/common/img/00/00/03/31/_T33178.jpg (accessed Oct. 11, 2005.
Screen Shot of a Flight Simulator; Available at http://orbit.madphys.ucl.ac.uk/images/gallery 64.jpg (accessed Oct. 11, 2005).
Screen Shot of a Role Playing Game; Available at http://images.fok.nl/upload/lotrrotk2.jpg (accessed Oct. 11, 2005).
Screen Shot of a Role Playing Game; Available at http://images.fok.nl/upload/lotrrotk3.jpg (accessed Oct. 11, 2005).
Arcadia, vol. 2, No. 12, Enterbrain, Inc., Dec. 1, 2001, pp. 56-63.
Konami Official Guide Perfect Series, Tokimeki Memorial—Forever with You: Official Guide, First Edition, Konami Corporation, Jun. 29, 1997.
Login, vol. 21, No. 4, Enterbrain, Inc. Apr. 1, 2002, pp. 70-77.
Reynolds, Craig, "Flocks, Herds, and Schools: A Distributed Behavioral Model," Proceedings of SIGGRAPH '87, Computer Graphics 21(4), Jul. 1987.
Reynolds, Craig, "Interaction with Groups of Autonomous Characters," Proceedings of Game Developer Conference 2000, San Francisco, CA 2000.
Reynolds, Craig, "Steering Behaviors for Autonomous Characters," Proceedings of Game Developers Conference 1999.
Super Mario Brothers: Complete Cheat Book, Tokuma Publishing Co., Ltd., Nov. 20, 1985, p. 9.
Yu, Bin et al., "A Social Mechanism of Reputation Management in Electronic Communities," Proceedings of 4th International Workshop on Cooperative Information Agents, 2000.
Aguilera, S. et al., "Impaired Persons Facilities Based on a Multi-Modality Speech Processing System," Proc. on Speech & Language Tech., 1993.
Arons, B., "Authoring and Transcription Tools for Speech-Based Hypermedia," Proc. of American Voice I/O Society, 1991.
Arons, B., "Hyperspeech: Navigating in Speech-Only Hypermedia," Proc. of Hypertext, 1991.
Bennacef, S.K., A Spoken Language System for Information Retrieval Proc. of ICSLP, 1994.
Gauvain, J.L. et al., "Speech Recognition for an Information Kiosk," Proc. of ICSLP, 1996.
Gauvain, J.L. et al., "Spoken Language Component of the MASK Kiosk," Human Comfort and Security fo Information Systems, 1995.
Gauvain, J.L. et al., "The LIMSI Continuous Speech Dictation System," Proc. ARPA Human Lang. & Technology, 1994.
Gauvain, J.L. et al., "The LIMSI Continuous Speech Dictation System: Evaluation on the ARPA Wall Street Journal Task," Proc. of the IEEE-ICASSP, 1994.
Goddeau, D. et al., "Galaxy: A Human-Language Interface to On-Line Travel Information," Proc. of ICSLP, 1994.
House, D., "Spoken-Language Access to Multimedia (SLAM): Masters Thesis," Oregon Graduate Inst., Dept. of CS and Eng., 1995.
Mostow, Jack et al., "Towards a Reading coach That Listens: Automated Detection of Oral Reading Errors", Proc. of the 11th Ntl. Conf. on A.I., 1993.
Russell, M. et al., "Applications of Automatic Speech Recognition to Speech and Language Development in Young Children," Proc. of ICSLP, 1996.
Lamel, L.F. et al., "Recent Developments in Spoken Language Systems for Information Retrieval," ESCA ETRW Spoken Dialog Systems, 1995.
Language Industry Monitor, "Janet Baker's Optimism," 1992.

(56) References Cited

OTHER PUBLICATIONS

Julie O'B. Dorsey et al., Design and Simulation of Opera Lighting and Projection Effects, Program of Computer Graphics, Computer Graphics, Jul. 1991, vol. 25, No. 4, New York.
Justin Calvert, SCEE's latest plans for its Eye Toy peripheral will effectively turn the PlayStation 2 into a videophone. First screens inside, SCEE announces Eye Toy; Chat, Game spot, http://www.gamespot.com/news/6095429.html, May 5, 2004.
Marks, Richard, "Bandwidth Management Through Lightening Control of a User Environment via a Display Device" May 4, 2007.
Shree K. Nayer et al., Lighting Sensitivity Display, ACM Transactions on Graphics, Oct. 2004, vol. 23, No. 4, pp. 963-979, New York.
Simon Spagnoletti, Philips Ambilight Tv, Home Entertainment, engadget, Jul. 8, 2004.
Wikipedia Article on Diablo II, http://en.wikipedia.org/wiki/Diablo_11.
Diablo II Frost nova Description, http://diablo2.diablowiki.net/Frost_Nova.
Keith Diefendorff, "Sony's Emotionally Charged Chip", Microprocessor Report, vol. 13, No. 5, Apr. 19, 1999.
Sony Computer Entertainment, Inc., "Fantavision Game Manual", 2000.
Wikipedia—The Free Encyclopedia, "Aimbot", http://en.wikipedia.org/wiki/Aimbot (last updated Jun. 3, 2005; last accessed Jul. 5, 2005).
European Search Report mailed Jan. 19, 2004 in EP Application No. EP02009339.
Communication from the Examining Division for EP 02009339 mailed Jan. 19, 2006.
Communication from the Examining Division for EP 02009339 mailed Dec. 11, 2006.
Communication from the Examining Division for EP 02009339 mailed Jul. 4, 2007.
Communication from the Examining Division for EP 02009339 mailed Sep. 17, 2008.
Communication from the Examining Division about intention to grant a European Patent for EP 02009339 mailed Nov. 16, 2009.
Communication re: Decision to grant a European Patent for EP 02009339 mailed Feb. 18, 2010.
International Search Report for PCT/US02/32438 mailed Feb. 4, 2013.
International Search Report for PCT/US2007/010944 mailed Feb. 18, 2008.
Rule 109/110 Communication from the Examining Division regarding possible amendment of claims for EP 02769043.7 mailed May 25, 2004.
European Search Report mailed Dec. 21, 2004 in EP Application No. EP02769043.7.
Communication from the Examining Division mailed Apr. 28, 2005 in EP Application No. EP02769043.7.
Communication from the Examining Division regarding Summons to attend oral proceeding mailed Oct. 24, 2006 in EP Application No. EP02769043.7.
Communication from the Examining Division regarding Decision to refuse a European patent application mailed Jan. 31, 2007 in EP 027699043.7.
International Search Report for PCT/US02/02710 mailed Sep. 12, 2002.
Rule 109/110 Communication from the Examining Division regarding possible amendment of claims for EP 02704295.1 mailed Sep. 5, 2007.
Communication from the Examining Division mailed Apr. 23, 2004 in EP Application No. 02704295.1.
Communication from the Examining Division mailed Dec. 15, 2004 in EP Application No. 02704295.1.
Communication from the Examining Division re: Summons to attend oral proceedings mailed Dec. 13, 2005 in EP Application No. 02704295.1.
Communication from the Examining Division re: Decision to refuse a European Patent application mailed Apr. 12, 2006 in EP Application No. 02704295.1.
Rejection mailed in CN application 201010245413.8 on Sep. 7, 2012.
Rejection mailed in CN application 201010245413.8 on Apr. 1, 2013.
European Search Report for EP 10007803.9 mailed Aug. 8, 2013.
Rejection mailed Mar. 26, 2013 in JP Application No. 2010-167803.
Rejection mailed Mar. 16, 2012 in KR Application No. 10-2010-0072613.
International Search Report & Written Opinion dated May 1, 2014 in Application No. PCT/US2013/067135 filed Oct. 28, 2013.
Rejection mailed Mar. 2, 2004 in KR Application No. 10-2002-00265621.
Decision to Grant mailed Oct. 5, 2005 in JP Application 2002-5607373.
Rejection mailed Nov. 16, 2003 in JP Application 2002-5607373.
Rejection mailed in CN application 201010245413.8 on Nov. 5, 2013.
European Search Report for EP 03254168.2 mailed Apr. 23, 2004.
1st Communication from the Examining Division in EP 03254168.2 mailed Sep. 29, 2006.
Stern, Andrew. Virtual Babyz: Believeable agents with Narrative Intelligence, Narrative Intelligence AAAI Symposium, Nov. 1999. Online. Viewed Apr. 28, 2006. http://www.cs.cmu.edu/afs/cs/user/michaelm/www/nidocs/Stern.html.
"Babyz Features Page" Online. Viewed May 3, 2006. www.babyz.net/features.html.
"Babyz". Wikipedia online reference. Viewed May 1, 2006. http://en.wikipedia.or.q/wiki/babyz.
"Sprigg, Sean M., Patent Examiner, Examiner's Affidavit, Feb. 4, 2000.[no file located]".
Northwestern University CS395, Game Design Course "Simulation and Modeling: Under the Hood of the Sims", Spring 2002. http://www.cs.northwestern.edu/%7Eforbus/c95-gd/lectures/The_Sims_Under_the_Hood_files/frame.htm.
Simpson, Dan. "The Complete Sims Guide" Feb. 6, 2005, pertinent sections printed from the Internet, may also be found in its entirety at: http://www.neoseeker.com/resourcelink.html?rlid=16238&rid=15516.
"Sequence Paradium 2—Laughter in the Dark—Tactical Guidebook", First Edition, Keibunsha Inc., Feb. 10, 2005, pp. 5-32.
Sprigg, Sean M., Patent Examiner, Examiner's Affidavit, Nov. 9, 2005.
Stern, Andrew. "Andrew Stern". Online. Viewed Apr. 28, 2006. http://quvu.net/andrew/resume.html.
Stewart, Nick. "The Adrenaline Vault Review of the Sims", Mar. 9, 2000. Printed from the Internet.
"The Sims", Oct. 14, 2005, pertinent sections printed from the Internet, may also be found in its entirety at:http://pc.gamespy.com/pc/the-sims/.
Decision to Grant / Notice of Allowance mailed Jun. 3, 2014 in JP 2010167803 filed Jul. 27, 2010.
Rejection mailed Mar. 15, 2005 in JP 2003-288128 filed Aug. 6, 2003.
Rejection mailed Dec. 13, 2005 in JP 2003-288128 filed Aug. 6, 2003.
Notice of Allowance mailed Oct. 31, 2012 in KR Oct. 2010-0072613.

* cited by examiner

REAL-TIME, CONTEXTUAL DISPLAY OF RANKED, USER-GENERATED GAME PLAY ADVICE

CROSS-REFERENCE TO RELATED APPLICATIONS

The present application is a continuation-in-part and claims the priority benefit of U.S. patent application Ser. No. 11/850,516 filed Sep. 5, 2007 and entitled "Ranking of User-Generated Game Play Advice," the disclosure of which is incorporated herein by reference.

BACKGROUND OF THE INVENTION

1. Field of the Invention

The present invention generally relates to interactive game play. More specifically, the present application relates to the real-time and contextual display of ranked, user-generated game play advice rendered to aid a user with interactive game play.

2. Description of the Related Art

Improvements in processing power and graphics quality have led to increasingly complex interactive gaming environments. For example, the PlayStation®3's RSX graphics processor allows for freedom of graphics expression in creating next-generation, real-time 3D imagery. Working in tandem with Sony Computer Entertainment Inc.'s Cell Broadband Engine™ Architecture, RSX processor rendered graphics are unparalleled in quality and realism.

Increasingly complex gaming environments have, in turn, resulted in more complex story lines, game play objectives, missions and tasks, and capabilities associated with game play avatars. As a result, interactive game play has become more challenging even for experienced game players. If a game becomes too challenging, however, game players may forsake future game play out of frustration.

To help game players overcome obstacles or achieve goals in a variety of interactive games, various content providers have begun publishing game magazines. These magazines provide game players with a 'walk thru' that tell the reader/game player where to go and what to do in order to 'win' the game or obtain the highest possible score. Hints or suggestions with respect to special moves or avatar capabilities may also be described in these gaming magazines.

While these magazines may be informative, they suffer from a number of drawbacks. If the magazine is not published by an official source (e.g., an official partner of the game developer), the magazine may omit essential information. In some instances, an unofficial magazine may publish incorrect information. Incorrect information may also result from the tendency to rush and publish these magazines concurrently with the release of an interactive game title to allow for concurrent purchase—even if the magazine is published by an official source.

Game players may also discover 'Easter Eggs' or other secrets during the course of game play. These secrets may not be a part of even an official magazine due to the fact that some game design engineers 'slip in' these Easter Eggs without the knowledge of the magazine publisher. Many interactive games also allow for the creation of special moves that may not have initially been conceived of by the game developer. As a result, these special moves are not a part of the game play magazine—official or otherwise—as their development occur after the magazine and associated game has gone to market.

Once game play magazines publish, subsequent editions tend not to be published. The lack of subsequent, updated editions may further the information that may be withheld from game players. Unique game play situations or circumstances may not become apparent until the interactive game is played by a large number of game players. These situations and circumstances may not be addressed in the gaming magazine thereby leaving game players at a loss as to how they may properly address the same.

In contrast, the Internet offers the opportunity for endless publishing and republishing of information. If a particular solution is not offered in a game magazine, that solution may subsequently be published on the Internet.

Notwithstanding endless publishing possibilities, websites on the Internet are often decentralized and unorganized. In some instances, there is no 'official website' as game developers may wish for game players to purchase a 'for fee' official magazine rather than access a free on-line website. Additionally, one website may offer one solution for one particular game play situation whereas another website may offer a solution for another situation. In order for a game player to obtain a complete 'walk thru' of a particular interactive game, the user may have to visit multiple websites on the Internet. Since these websites tend to be 'unofficial,' there is often an issue with the veracity or accuracy of the information displayed on these websites.

A further lacking in the aforementioned prior art solutions is the fact that this information—regardless of source, thoroughness, or quality—is that the information lacks contextual relevance. Some game play environments include a variety of 'acts' or 'levels' of game play; these scenes or levels often include a variety of subsidiary 'scenes' or 'stages.' For example, a game based on the D-Day military offensive may involve four scenes: crossing the English Channel; advancing up Omaha Beach; taking artillery positions at the head of the beach; and securing numerous military objectives in the French countryside. Game play advice concerning how to best maneuver an LCM Landing Craft while crossing the English Channel has no value to the game player that currently needs advice on how to best conduct a room-to-room search in the bombed out buildings of the nearby town of Bayeux. Locating the contextually appropriate game play advice may be time consuming if not confusing to a game player in the 'heat of battle.'

The aforementioned prior art game play advice solutions are also wanting for lack of real-time provisioning of information. Many of today's interactive games are incredibly realistic, action-intensive simulations such as Warhawk from Sony Computer Entertainment America Inc. A game player often finds themselves 'in the zone' with respect to game play. If a game player is continually forced to interrupt game play (e.g., 'pausing' the game) in order to flip through pages of a game play magazine or click-thru various pages of content on the Internet, the game player will quickly find themselves losing their rhythm. In such complex game play environments, loss of that rhythm may be to the detriment of continued game play regardless of any hints or information that may have been acquired during the interruption.

Many games are also network or community-based with multiple players located around the country or around the world. Such games may occur in real-time. In certain of these games, the interruption of game play through 'pause' functionality may not be an option as may be available in a single-player game environment. The game player may be forced to drop out of a particular network game because the gaming environment cannot both exist in a timed-out/paused state for one game player yet continue in real-time for all others.

While some network or community-based games may allow for a 'pause' or other 'time out' feature, doing so may be to the detriment of the player invoking the interruption. In some games, for example, other game players may continue to advance through the game play environment by obtaining objects of value or reaching objectives within the environment. In other games, competing and non-paused players may position themselves to take retributive action on the 'paused' game player when they re-enter the gaming environment. For example, a non-paused player may sneak up behind a 'paused' player in a combat environment and assassinate the 'paused' player at point-blank range as the 'paused' player is unable to observe or react to events in the game environment while in a paused state.

There is a need in the art for game play advice that is complete and up-to-date regardless of when a particular interactive gaming title is released. Further, there is a need for game play advice that is pervasive and easily accessible to game players. There is also a need for game play advice that is accurate and credible such that game players can trust or rely upon the rendered advice. There is a still further need for game play advice that is contextually appropriate and provided in real-time when such information is needed most.

SUMMARY OF THE INVENTION

Embodiments of the present invention provide a system and methods for managing user-generated and context appropriate game play advice.

In one exemplary embodiment, a method for managing user-generated game play advice includes receiving new game play advice from a user. The new game play advice is displayed to a community of users. The new game play advice is initially displayed in a default ranking position, in which the default ranking position is an initial, arbitrarily chosen position. Display of the new game play advice occurs in a contextually appropriate fashion and in conjunction with previously received game play advice. Feedback associated with the quality of the new game play advice and/or the previously received game play advice is received from the community of users, the feedback including information related to context. The new game play advice is ranked against the previously received game play advice based on the feedback received from the community of users. The new game play advice is then (re)displayed in conjunction with the previously received game play advice in a context appropriate manner. The (re)display of the new game play advice and previously received game play device occurs in accordance with the ranking of the new game play advice and the previously received game play advice and without the default ranking initially allocated to the new game play advice.

In another exemplary embodiment, a system for managing context appropriate user-generate game play advice is provided. The exemplary system includes a game play advice submission engine. The game play advice submission engine receives game play advice submissions over a network; the submissions are allocated a ranking by a ranking engine. A game play advice display engine displays game play advice submissions in accordance with a ranking allocated by the ranking engine; the game play advice engine further operates in conjunction with a context engine that identifies the proper context for display of certain advice. A feedback engine receives feedback from a community of users with respect to the quality of the game play advice displayed by the game play advice display engine. The feedback engine and the ranking engine operate to allocate a new ranking to the game play advice in accordance with the feedback received from the community of users. The game play advice is subsequently displayed by the game play advice display engine in accordance with the new ranking.

A further exemplary embodiment provides for a method for displaying context appropriate and user-generated game play advice. In the present exemplary method, new game play advice is received from a first user, that user having previously received feedback from a community of users including information related to game play context. The new game play advice is ranked against previously received game play advice. The previously received game play advice has been submitted by at least a second user that has previously received feedback from the community of users including information related to context. The new game play advice is ranked against the previously received game play advice based on the user feedback received from the community of users. The new game play advice is displayed in conjunction with the previously received game play advice in a context appropriate manner. The new game play advice and the previously received game play advice are displayed in a contextually appropriate manner and in accordance with the ranking of the new game play advice and the previously received game play advice.

A still further embodiment provides for a method for managing context appropriate and user-generated game play advice where new game play advice is received from a user. The new game play advice is displayed to a community of users. The new game play advice is initially displayed in a default ranking position. Display of the new game play advice occurs in conjunction with previously received game play advice. The user submitting the advice receives feedback from a community of users as does another user, that user having previously received feedback from the community of users. The feedback includes information related to context. Feedback associated with the quality of the new game play advice and/or the previously received game play advice is also received from the community of users. A weighting value is assigned to the user feedback and the feedback associated with the quality of the game play advice. The new game play advice is ranked against the previously received game play advice based on the user feedback received from the community of users in addition to feedback associated with the quality of the game play advice. The ranking occurs in accordance with the weighting values assigned to the user feedback and feedback associated with the quality of the game play advice. The new game play advice is displayed in conjunction with the previously received game play advice and in accordance with the ranking of the new game play advice and the previously received game play advice.

DETAILED DESCRIPTION

The elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of particular tasks when executed by a processor, which may be general purpose or application specific. Computer-executable instructions and associated data structures stored in a computer-readable storage medium represent examples of programming means for executing the steps of the methods and/or implementing particular system configurations disclosed herein.

Figure 1:
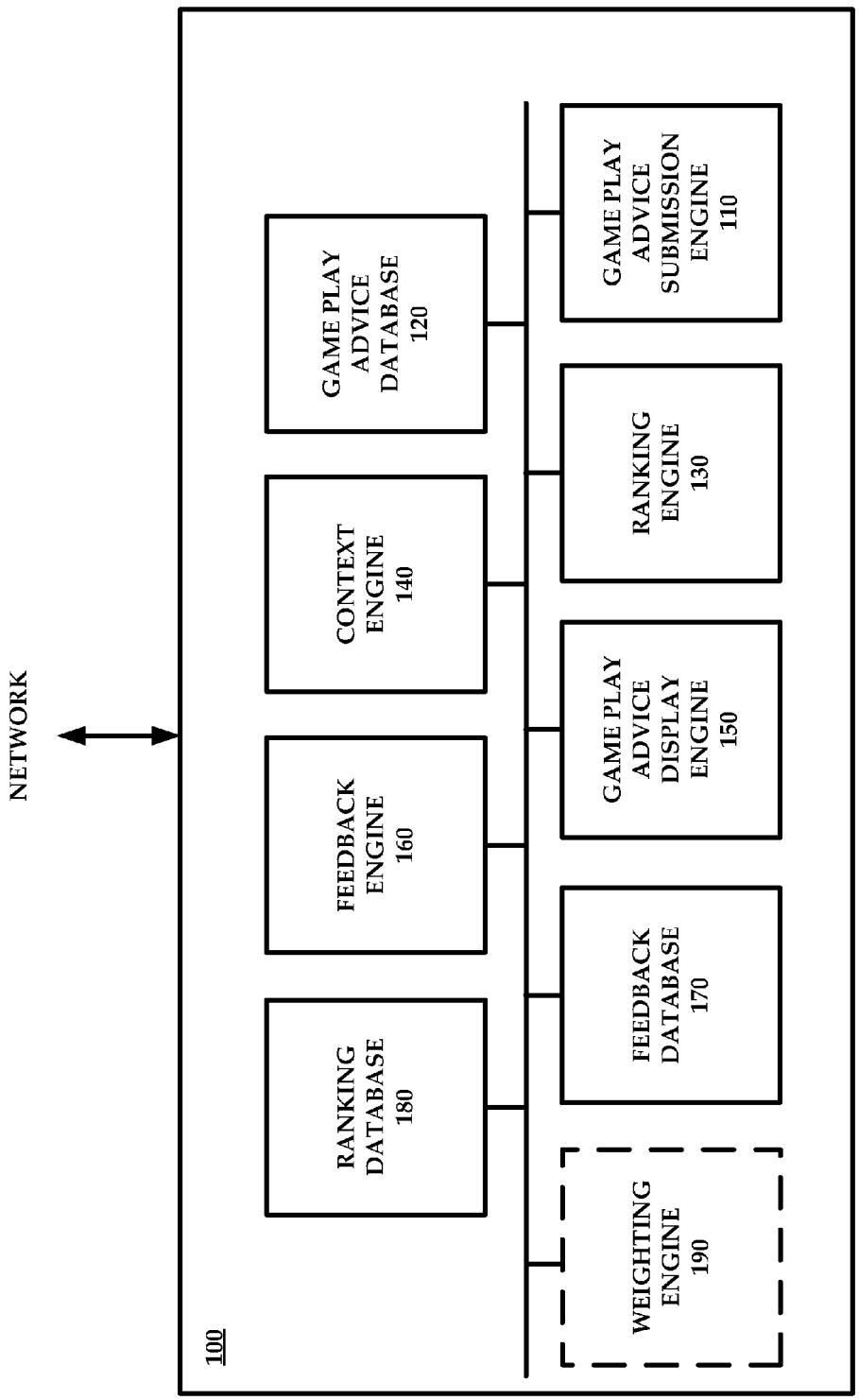
FIG. 1 illustrates an exemplary system for ranking and managing contextually appropriate user-generated game play advice.

FIG. 1 illustrates an exemplary system 100 for ranking and managing contextually appropriate user-generated game play advice. The system 100 of FIG. 1 includes a game play advice submission engine 110, game play advice database 120, ranking engine 130, context engine 140, game play advice display engine 150, feedback engine 160, feedback database 170, and ranking database 180. In some embodiments (like that illustrated in FIG. 1), the system 100 may also include an optional weighting engine 190. While various engines and databases are described in the context of FIG. 1, an embodiment of the present invention may offer the functionality of each or certain of these engines and databases in a single 'game play advice management' engine or database.

System 100 may be implemented in a network environment such as the Internet, a proprietary communications environment, or a combination of the two. In one example, system 100 is an integrated component of the Playstation® Network. System 100 (or components thereof) may communicate with the network environment utilizing any number of network interfaces as are known in the art. Examples of such interfaces include a 1000BASE-T Ethernet port or an IEEE 802.11 b/g network WiFi interface.

System 100 may be implemented in a computing device such as a server dedicated to managing user-generated game play advice including maintenance of various databases. Alternatively, system 100 may be implemented in a computing device hosting a number of applications such as community maintenance, admission, and network game data distribution. System 100 may be dedicated to a single network game, a genre of games, or any number of games having no particular affiliation at all.

System 100 may also be implemented in a distributed peer-to-peer environment. In such an implementation, certain applications and/or responsibilities may be managed by a group of computing devices in the environment. A first computing may be represented by a game platform such as the PlayStation®3. This particular computing device may be responsible for ranking operations that take place via a ranking engine and maintaining a database of related information. A second computing device such as a desktop or laptop computer may be responsible for feedback operations that take place via a feedback engine and maintaining a database of related information.

Various engines may be distributed to a community of users (e.g., players of a particular game or users in a general gaming network) through a push operation from a tasked server in the game community. Alternatively, various engines may be embodied in a computer-readable storage medium that also includes a particular game application (e.g., a disc). Distributed applications and engines may communicate directly via a group of peers or may be administered by a management server.

Game play advice submission engine 110 is configured to allow a user to communicate with the system 100 over network for submission of game play advice. Game play advice submission engine 110 may generate a user-interface for allowing user interaction with the system 100. The interface may be a simple text-entry screen where users identify a game title, user identity (i.e., who is submitting the advice) in the form of a 'real name' or 'screen name,' and particular game play advice.

Game play advice submission engine 110 may generate a 'drop down' menu to allow for easy entry of information. Drop-down menus may identify a variety of game titles (in order to maintain consistency of game title naming). Drop down menus may also allow for identification of particular types of advice such as special moves, Easter Eggs, unlocking weapons, or defeating particular enemies. Drop down menus may also identify particular portions of an interactive gaming environment by level or environmental description (e.g., Level 1 or 'The Volcano'). Similar identification may occur with respect to particular events, objects, weapons, or enemies.

Menus generated by the game play submission engine 110 may be level-based. A level-based menu configuration may cause the selection of one item at a first level of a menu to branch out into a series of options concerning a second level of related menu items. Selection of an entry at the second level may spawn a third-level and so on. Spawning of various levels may continue until there is no further information to be entered.

Entry of the game play advice may be textual where a user enters a written description of the game play advice (e.g., 'at the castle gate, look behind the statue for a hidden treasure'). Text-entry may occur through a virtual keyboard manipulated by a game controller coupled to a gaming platform. The gaming platform, in turn, is coupled to the system 100 via network. Submission of game play advice may be audible and provided by speaking into a USB microphone headset. In some embodiments, video clips or still-frame images of game play may be submitted in the context of or as game play advice. Combinations of game play advice submissions are also within the scope of the present invention (e.g., a video clip with audible narration).

Game play submission engine 110 further allows for a user providing a submission to note a particular context or contexts in which the game play advice may be relevant. Context may be specific such that a user making the submission provides an indication of stage, level, or chapter where the submission should be displayed. For example, submissions concerning control of an aircraft are irrelevant in the context of a ground assault notwithstanding that both types of game play occur in the same game albeit during different levels, stages, or chapters.

The game play submission engine 110 may identify specific chapters of game play or particular events related thereto to allow for consistent entry. As a result of the game play submission engine 110 controlling the naming process of contexts, inconsistent naming protocols may be avoided that might otherwise complicate presentation of context sensitive game play advice. For example, the submission engine 110 may indicate that hints related to storming the beach at Omaha in a World War II combat simulation are all provided under the category of 'Omaha Beach' instead of a series of user generated titles such as 'storming the beach,' 'Omaha,' 'chapter II,' and others. The game play submission engine 110 may work in conjunction with the context engine 140 with respect to providing naming protocols.

The game play submission engine 110 may also link the context in which the game play advice was entered. For example, a user may enter a 'game play advice' mode of a particular game whereby a user is allowed to traverse the game without certain distractions or the need to engage in certain tasks. Entry into such a mode may be allowed as a selected 'mode' or following successful completing of the level or chapter. A user may, upon encountering an event, object, or level warranting game play advice, enter into a submission mode to provide information. The context of that submission is then linked to the future provisioning of that advice.

The submission engine 110 may also allow for user corrections or annotations of game play advice. For example, a previous user might provide information concerning accessing a particular weapon, but erroneously identifies the particular weapon or provides some other contextually inappropriate information. A subsequent user (or users) receiving that contextually inappropriate information may recognize the error or that the information might be better presented in a subsequent stage or area of game play (or simply correct an otherwise minor error). The subsequent user may lodge a complaint or suggest that an entity tasked with quality assurance of game play advice review the submission and/or context of the same.

Game play advice database 120 is configured to manage user-generated game play advice submitted through an interface generated by the submission engine 110. Game play advice database 120 may manage submitted game play advice by user, game title, nature of the advice, date, size, content of the advice (e.g., video, audio, text, combinations of content), context, and so forth. Game play advice database 120 may include non-user generated game play advice (e.g., pre-stocked game play advice from the game publisher) that may also be ranked and displayed by system 100.

Game play advice database 120 may be configured to store all game play advice received through an interface generated by game play advice submission engine 110. Alternatively, certain game play advice may expire over time or upon the occurrence of certain events. For example, the game play advice database 120 may only retain the top-100 ranked game play advice submissions. Once a particular instance of game play advice falls below a top-100 threshold, that particular instance may be deleted from the game play advice database 120. Expiration may be temporal such that instances of game play advice that are not accessed for a particular period of time are removed from the game play advice database 120. Instances of game play advice may also be removed from the game play advice database 120 a predetermined number of days after having been submitted to the system 100.

Ranking engine 130 is configured to manage the ranking of game play advice stored in game play advice database 120. When new game play advice is received, the ranking engine 130 of FIG. 1 will assign a default ranking to that new instance of game play advice. This default ranking and any other ranking (including those generated as a result of user feedback) may be measured utilizing any rubric capable of distinguishing one instance of user-generated game play advice from another. Rankings may be numeric (e.g., 1, 2, 3 . . . 101, 102, etc.) or characteristic (e.g., poor, good, very good, excellent, etc.). Simplistic rankings may also be used such as a binary indication of 'good'/'bad' or 'thumbs up'/ 'thumbs down.' A percentage value may also be used by ranking engine 130. For example, an '86% ranking' may reflect that 86 percent of all user feedback received with respect to a particular instance of game play designated the advice as 'good or better.'

Tie-breakers may be utilized by the ranking engine 130 with respect to multiple instances of game play advice that are allocated rankings of equal value. Equally-ranked game play advice may be distinguished by an alphabetical ordering of the screen name or real name of the user submitting the game play advice. Equally-ranked game play advice may also be displayed based on the time the game play advice was submitted. Previously received and equally ranked game play advice may be moved to the bottom of a ranking ladder versus more recently received (and equally ranked) game play advice. Equally-ranked game play advice may also be displayed in a random order albeit in the context of other equally-ranked advice.

Ranking engine 130 may operate in conjunction with ranking database 180 to maintain a record of a current or prior ranking of any particular instance of game play advice. Ranking engine 130 may also work in conjunction with feedback engine 160, feedback database 170, and, in some embodiments, optional weighting engine 190 to more accurately identify the perceived quality of game play advice as adjudicated by a community of users.

Context engine 140 is tasked with providing game play advice in an appropriate context of game play such that it may be appropriately displayed by the game play advice display engine 150. Game play submission engine 110 allows for notation of appropriate contexts of game play advice. The context engine 140 may generate points of game play that would be appropriate for game play advice. For example, walking down an alleyway without threats, obstacles, or other encounters that would require tactical game play are not likely to warrant the need for hints or advice. Advancing up the beaches of Normandy on D-Day with heavy gun fire from German forces, obstacles and landmines on the beach, and advancing troops and equipment from the English Channel would clearly require quick and strategic thinking. In this instance, the context engine 140 would allow for generation of user submitted game play advice during the beach operations, but not likely in the casual walking down an alley. As such, a developer of game play may provide points for user providing of game play advice.

A game developer providing the ability to enter game play advice may be based on determinations made by the developer that a particular task or level will inevitably provide certain challenges thus making advice warranted. The context engine 140 may be programmed to correspond to such determinations. Further, the game developer may allow for the introduction of user generated game play advice in those contexts where the game developer provides their own default game play advice; these points may likewise be introduced into the context engine 140. Game developers, too, may study game play feedback in network games with respect to identifying choke points or other areas where particular obstacles might prove to be more challenging in actual game play implementation than those obstacles were during the course of pre-release testing. A game developer may release an update to the context engine 140 over a network that allows for introduction of user advice post-release. The submission engine 110 may then access the context engine 140 to allow for users to provide this information. These points may be with respect to levels, obstacles, events, enemies, and so forth.

As noted with respect to the submission engine 110, the context engine 140 may identify certain points of game play related to objects, challenges, or enemies as well as levels or stages as a whole. Game code or other metadata may be flagged with respect to objects or enemies and these flags may be recognized by the context engine 140 upon execution of the game code by a gaming system or processing device. These flags or metadata may be tied to allowing for entry of game play advice. For example, in a World War II simulation, a player might be crossing a field. The field, without any enemies present, may not warrant the need for game play advice—submissions or providing of the same. Later in that same game environment (the field) a tank may enter the scene and begin firing upon the game player. With the introduction of the tank, providing or receiving game play advice may now be warranted. For the tank to appear in the scene would require the execution of code related to the tank. The code for introducing and intelligently controlling the tank by the game platform may be flagged or identified by the aforementioned metadata. Once that flagged code or metadata is recognized by the context engine 140, a user may provide advice or receive the same.

The context engine 140, in this regard, is not only responsible for identifying those points or instances of game play where a user may provide advice, but also those instances where providing advice is appropriate. For example, in the previously mentioned alleyway example, no challenges are present thus making the introduction of advice by the system inappropriate or unnecessary. Should a sniper suddenly begin firing upon the game player, then advice on how to deal with the sniper may be appropriate for the user to consider. The context engine 140 may recognize that providing information related to the sniper is appropriate based on the game platform loading flagged code related to the sniper. Similar provisioning of advice may occur with respect to encountering objects and the like. The context engine 140 may be tied to the game play advice display engine 150 to allow for timely and contextually appropriate display of that advice.

Game play advice display engine 150 is configured to display user-generated game play advice in accordance with a ranking result generated by ranking engine 130 and in further consideration of determinations made by the context engine 140. Game play advice display engine 150 acquires information from the game play advice database 120 (the advice) and the ranking database 180 (the ranking of the game play advice as determined by ranking engine 130) and displays the game play advice in accordance with an allocated ranking upon the context engine 140 determining that the display of advice related to a particular aspect of game play is appropriate. The game play advice display engine 150 may utilize an asynchronous programming language to provide real-time (or substantially near real-time) updates to ranked game play advice for display to a community of users.

Figure 5:
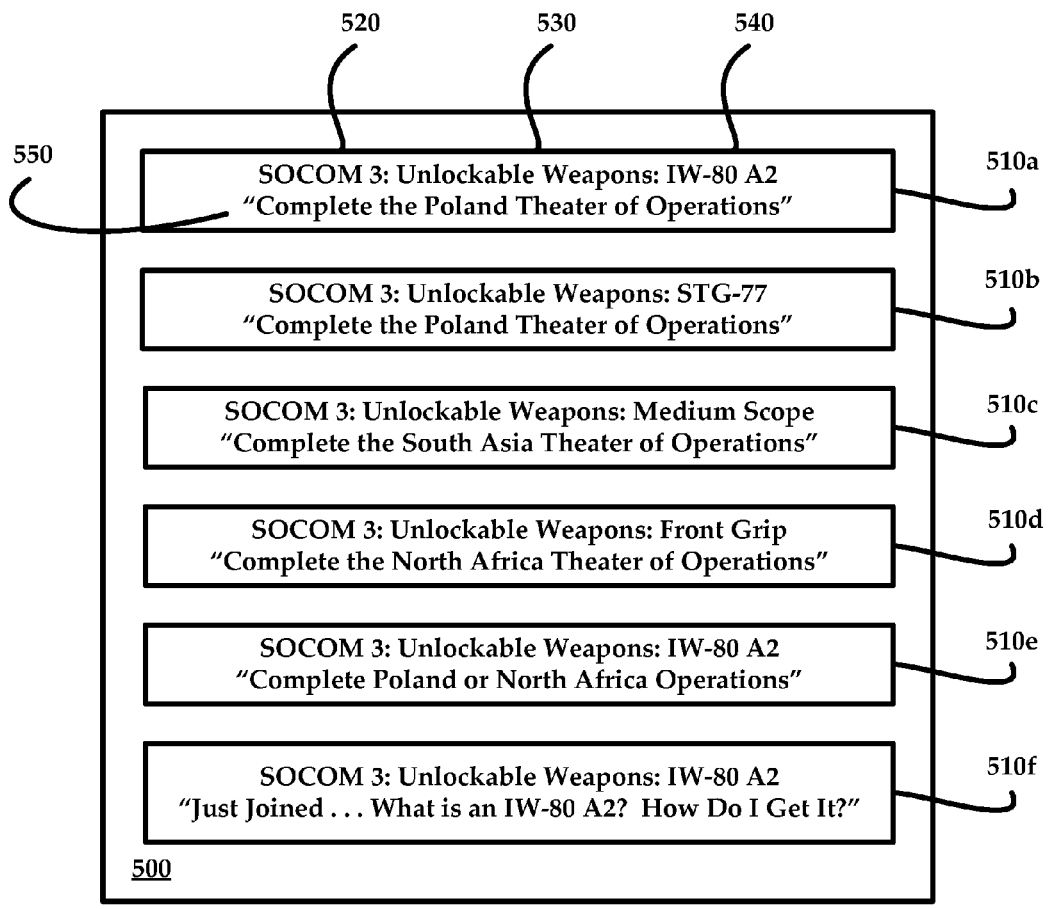
FIG. 5 illustrates an exemplary ladder ranking of user-generated game play advice.

Game play advice display engine 150 may utilize a ladder ranking of game play advice. In such an embodiment, the highest quality advice is presented at the top of a ladder and the worst advice is relegated to the bottom of the ladder. The quality of the advice decreases as a user moves from the top of the ladder to the bottom. In some embodiments, the particular arrangement of the advice may be subject to user or system preferences (e.g., the advice may be listed in an inverse order where the best advice is listed at the bottom of the ladder and the worst advice at the top). FIG. 5 illustrates an exemplary ladder ranking 500 of user-generated game play advice (510a . . . f).

In FIG. 5, the ladder ranking 500 includes six exemplary instances of user-generated game play advice (510a . . . f). Each instance of game play advice identifies a title of the interactive game for which the advice is rendered 520 (i.e., SOCOM 3); the nature of the advice 530 (i.e., pertaining to 'unlockable' weapons); and the particular unlockable weapon at issue 540 (e.g., an IW-80 A2, an STG-77, a medium scope, and a front grip). Each instance also includes the advice itself 550 (e.g., "Complete the Poland Theater of Operations" in the case of instance 510a).

The information displayed in each instance of game play advice (e.g., game title, nature of the advice, etc.) and the format of the same (e.g., text entries versus graphical illustrations) may vary depending on a particular embodiment of system 100 and game play advice display engine 150. Additional information may also be displayed in each instance of game play advice. For example, an embodiment of ladder ranking 500 may include the screen name of the user submitting particular information, the date the advice was submitted, a visible indication of the ranking of the instance of game play information (e.g., 1 of 6; 86% approval; thumbs up), or the number of times feedback has been rendered with respect to that particular instance of game play advice. An indication that a particular ranking is the result of a default ranking may also be displayed.

In FIG. 5, the best quality game play advice is displayed at (or near) the top of the ladder ranking 500. With respect to this particular game title, the IW-80 A2 may represent a particularly desirable weapon. Information regarding acquisition of this weapon may, therefore, be highly valued (i.e., to obtain this weapon "Complete the Poland Theater of Operations" as reflected by advice 550 of instance 510a).

In another instance of game play advice (510f), the weapon is the same as that discussed in the most highly ranked instance (510a) (i.e., the aforementioned IW-80 A2) but the advice is of such poor quality that the advice is located at the lower-most rung of the ladder ranking 500. With respect to game play advice instance 510f, the user submitting the 'advice' has just begun playing this particular game title and does not know what an IW-80 A2 is or how to acquire the same. As such, this unhelpful instance of game play advice is appropriately ranked and subsequently displayed at the bottom of the ranking ladder 500. As a result of this ranking, a user searching for information concerning the acquisition of an IW-80 A2 saves time by avoiding review of unhelpful information. Further, the user searching for advice on acquiring the IW-80 A2 is more likely to receive complete and accurate advice.

Figure 6A:
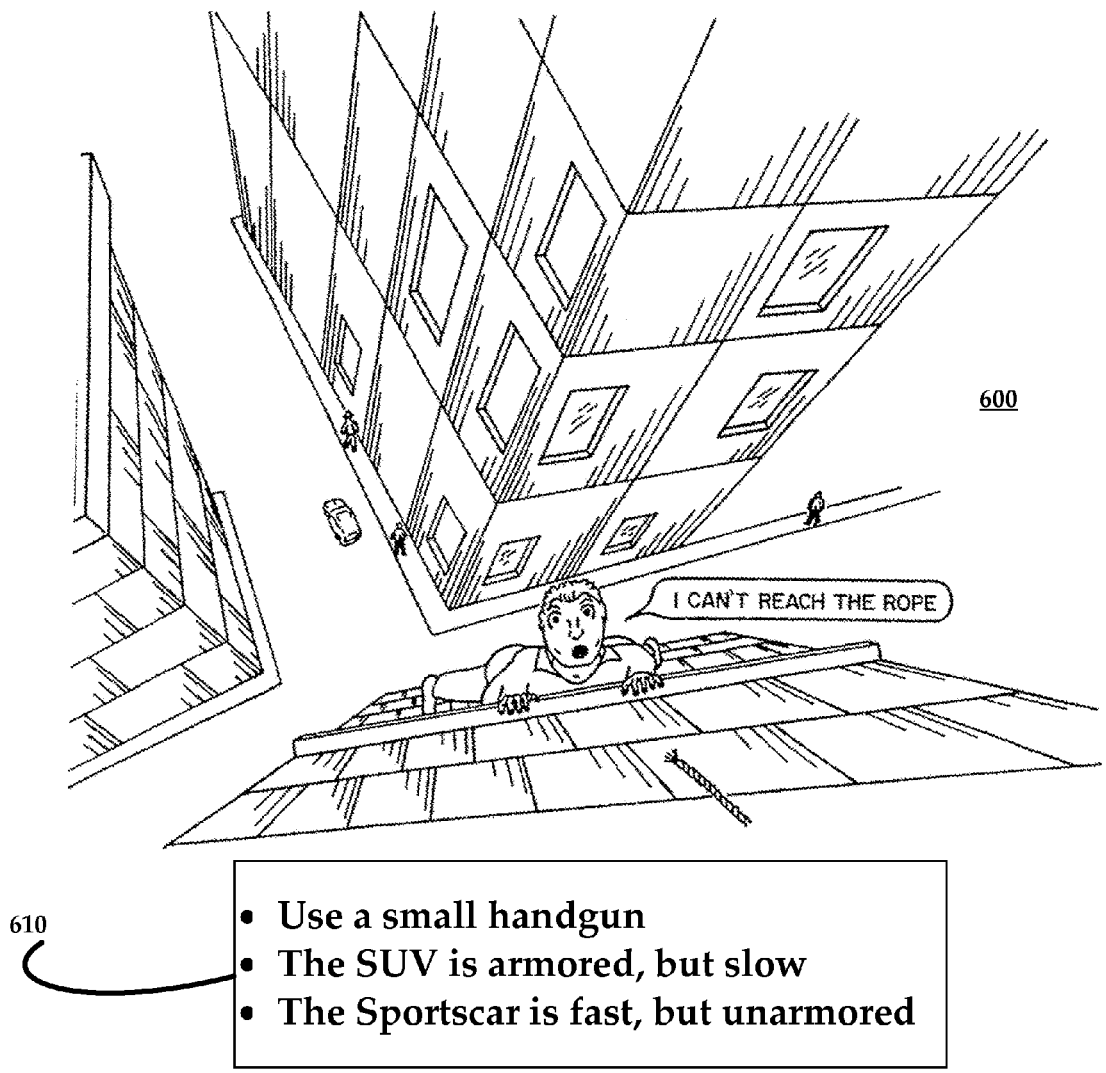
FIG. 6A illustrates a particular game environment with a display of contextually inappropriate game play advice.
Figure 6B:
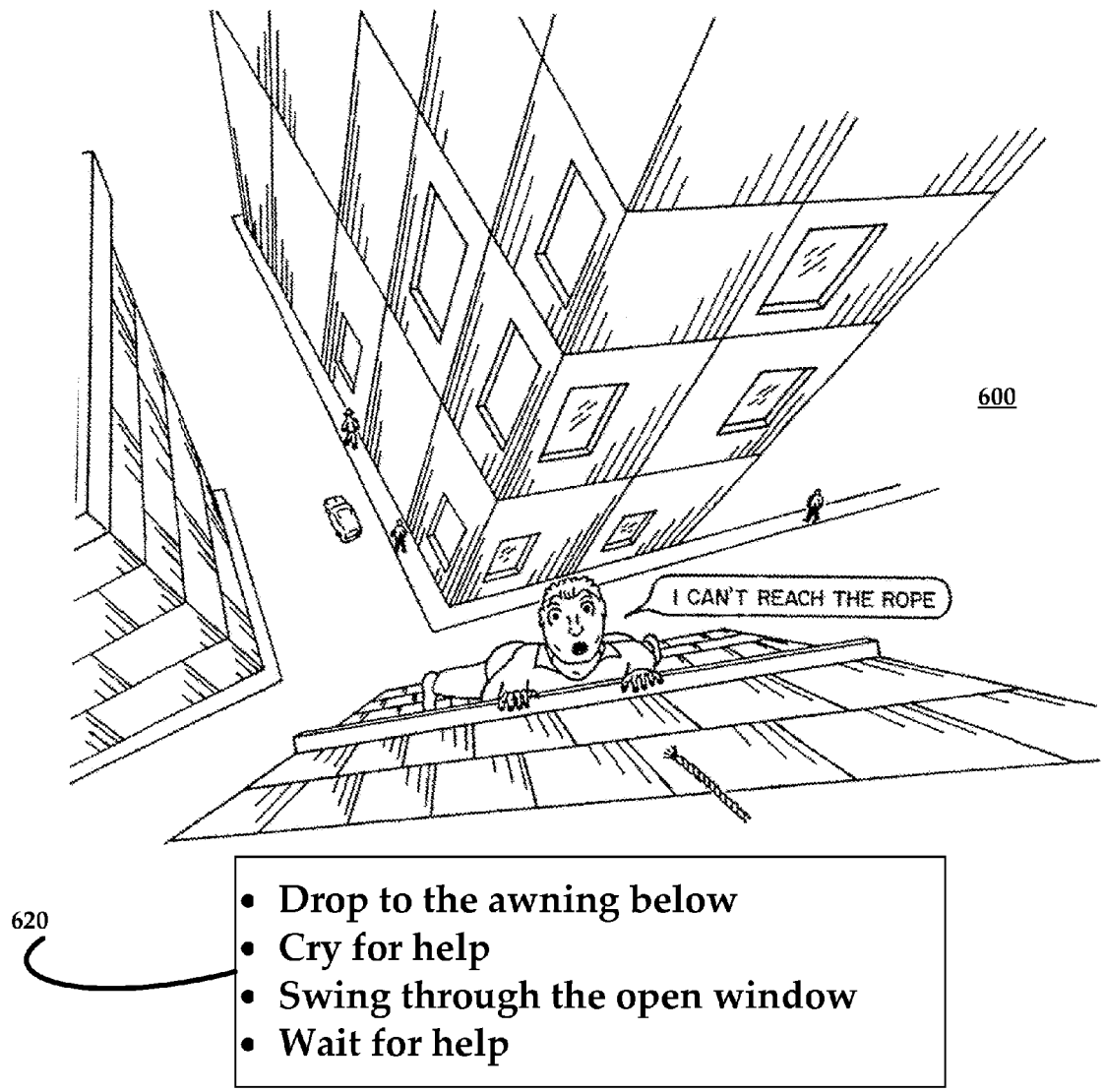
FIG. 6B illustrates the same game environment of FIG. 6A but with contextually appropriate game play advice.

Game play advice display engine 150 may display advice in the context of a real-world virtual environment and/or a first- or third-person avatar. By working in conjunction with the context engine 140, the game play advice display engine 150 may display the highest ranked information but do so in the most appropriate context. For example, in the context of FIG. 5, displaying information about an IW-80 A2 may be in appropriate when a particular level does not offer the user of the IW-80 A2 or the user has not yet reached the Poland Theater of Operations. That information may be entirely appropriate, however, when the user is actually in the aforementioned Polish Theater and otherwise able to acquire the IW-80 A2 weapon. FIGS. 6A and 6B further illustrate the benefits of the display engine 150 working in conjunction with the context engine 140 to provide quality information in the most appropriate context. Other means of display of game play advice beyond the aforementioned ladder and virtual environment are within the scope of the present invention. Game play advice may be listed as a series of entries in a 'chat' string. Game play advice may be displayed and detailed commentary (in addition to ranking feedback) concerning the quality of that advice may be provided by the community of users. Game play advice may also be provided through a series of hyperlinks. Graphic images may also be utilized, especially in the context of game play advice that incorporates full motion video or still images. Links to audio files may be appropriate in the case of audio-rendered advice. All of the aforementioned means of providing game play advice to a community of users (and in accordance with an assigned default or feedback controlled ranking) may be managed by the game play advice display engine 150 and context engine 140.

Feedback engine 160 is configured to accept feedback from other game players following their viewing and subsequent use of game play advice provided via the game play advice display engine 150 and a determination of contextual appropriateness by context engine 140. Feedback engine 160 may be integrated or work in conjunction with game play advice display engine 150 with respect to receiving feedback. For example, feedback engine 160 may generate a prompt for receiving user-generated feedback. The prompt may be displayed in the immediate context of particular instances of game play advice, which are displayed by game play advice display engine 150.

User feedback may be any subjective assessment capable of distinguishing one instance of user-generated game play advice from another. User feedback may be numeric (e.g., 1 to 10, with 10 being high quality and 1 being low) or characteristic (e.g., good, very good, excellent, etc.). Simplistic binary indications of 'good' or 'bad' or a 'thumbs up' or 'thumbs down' may also be used. Feedback may include a textual (or spoken) assessment of the user-generated game play advice. Feedback may be entered manually (e.g., entry of a '10' through a virtual keyboard), selected from drop down menus, or submitted via graphic representations such as on-screen icons (e.g., selecting a 'thumbs up').

Feedback engine 160 may also be configured to request and accept a grade for a particular user from a community of users, the user having submitting game play advice to the system 100. The user grade may be a subjective assessment of a particular user registered with system 100. Other users in a community may grade a particular user based on their knowledge of the graded user's in-game exploits in a manner similar to providing feedback with respect to game play advice.

User grades may also be assessed automatically by the ranking engine 130 or an independent user grade engine (not shown). A grade for a particular user may be allocated with respect to the time that a user has been registered with the system 100 or played a particular game title (thus suggesting experience). Grades may also be assessed based on the number of tasks that a user has completed in a particular game or the number of levels that the user has 'conquered.' User grades may be particular to game, geographic region, or the entirety of the gaming network. The game community may also be defined by various tiers of experience (e.g., beginners, intermediate users, and experts). User grades may also be allocated within the delineation of a particular tier to which a graded user belongs.

Feedback engine 160 may also take into consideration user feedback as it concerns the context of particular game advice. For example, if a user provides information concerning the user of anti-tank weapons and no tanks are present in a particular level, the advice may be relevant with respect to combating an approaching tank battalion, but not when the user is more concerned with traversing a mine field. Feedback may provide written (text) indications of a more appropriate place for the information or may allow for a 'checkbox' type interface where a user notes the contextually inappropriate nature of certain information and then identifies on a pre-generated list where the information might be best presented. The feedback might be manually reviewed to allow for its transition to a better context or automated in that once a certain amount of feedback has been received, the advice is assigned to a new context presentation point by the context engine 140. As such, the context engine 140 may take into consideration (in real-time or as part of a previously executed routine) certain feedback information with respect to identification of context.

Feedback database 170 is configured to manage user feedback to game play advice submitted through feedback engine 160. Feedback database 170 may be configured to store all community generated feedback as it pertains to game play advice. Certain feedback may expire over time (e.g., a predetermined number of days after having been submitted to the system 100). Feedback database 170 may track the nature of the feedback (e.g., a subjective assessment) with respect to a particular instance of game play advice. Feedback database 170 may further track the identity of the user submitting user feedback via the feedback engine 160. Feedback database 170 may store certain information concerning context of certain information, which may ultimately be utilized by the context engine 140 in providing contextually appropriate indications of display of advice for display engine 150.

Ranking database 180 is configured to manage ranking of user-generated game play advice as ranked by the ranking engine 130. Ranking database 180 may also store user grade information generated by the ranking engine 130. Ranking database 180 may be updated in real-time (or substantially in real-time) in order to provide game play advice display engine 150 with the most up-to-date and available ranking information as it pertains to particular instances of game play advice. Ranking information stored in the ranking database 180 may expire after a set period of time. Lower ranked game play advice (e.g., advice falling below a certain minimum ranking) may be removed from the ranking database 180 while higher ranked information is maintained in the ranking database 180.

Optional weighting engine 190 may be used for ranking user-generated game play advice based on the quality of the advice and the reputation or experience of the user submitting the advice. Optional weighting engine 190 is configured to introduce a weighting algorithm that allocates a particular value to the grade of a user submitting game play advice and another value to the actual game play advice. For example, if the user is regarded by the game community (i.e., the user has a higher user grade) but the game play advice submitted by the player is of low quality (as reflected by user feedback), the optional weighting engine 190 may apply a first weighting value to the user grade (e.g., 75%) and a second weighting value to the game play advice (e.g., 25%) to formulate (in conjunction with the ranking engine 130) a ranking of the game play advice. The game play advice is then displayed through the game play advice display engine 150 whereby the first and second weighting values allocated by the optional weighting engine 190 proportionally affect the ranking of the game play advice. The actual weighting valuations applied to the user grade and the game play advice may be set and adjusted by an administrator of the system 100. The weighting engine 190 may also be used in determining when certain game play advice should be assigned to a new context as a result of user feedback.

Figure 2:
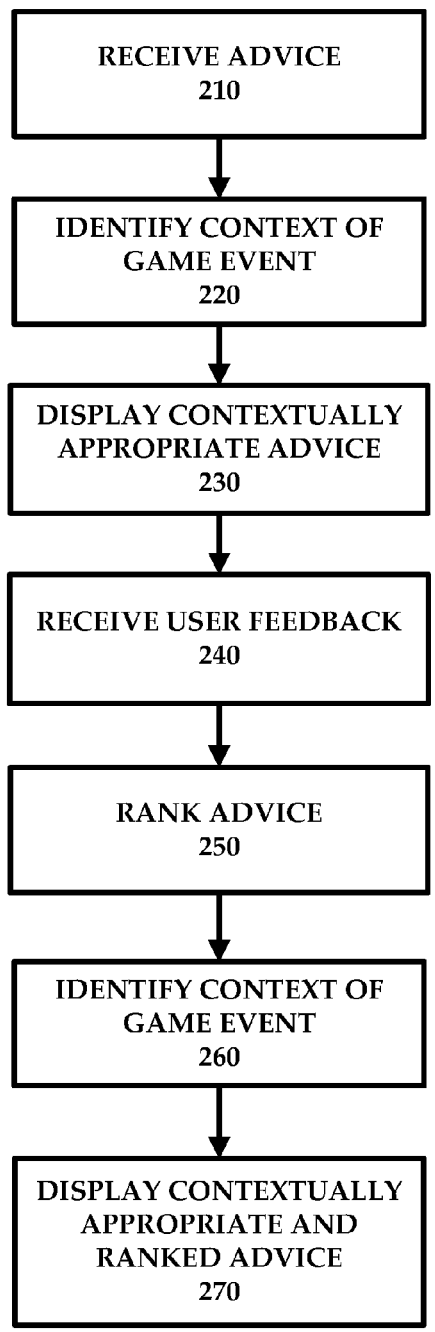
FIG. 2 illustrates an exemplary method for ranking user-generated game play advice based on the quality and context of the advice.

FIG. 2 illustrates an exemplary method 200 for ranking user-generated game play advice based on the quality and context of the advice. The steps identified in FIG. 2 (and the order thereof) are exemplary and may include various alternatives, combinations, equivalents, or derivations thereof including but not limited to the order of execution of the same. The steps of the process of FIG. 2 (and its various alternatives) may be embodied in hardware or software including a computer-readable storage medium (e.g., optical disc, memory card, or hard drive) including instructions executable by the processor of a computing device.

In step 210, user-generated game play advice is received from a user in the community via an interface generated by the game play advice submission engine 110. Upon receipt of the user-generated game play advice in step 210, the advice is processed by the system 100 as described in the context of FIG. 1 and assigned a default ranking by ranking engine 130. The game play advice may be stored in game play advice database 120. The default ranking may be stored in ranking database 180.

In step 220, the user-generated game play advice is assigned a particular context either by the user submitting the advice or by the context engine 140. In some instances, the context engine 140 may control the available contexts that a user assigns to the advice. In other instances, the context engine 140 may make a determination as to the specific context of advice.

The processed and default ranked game play advice is subsequently displayed via the game play advice display engine 150 in step 230 in response to a context appropriate situation as governed by the context engine 140. Upon display in step 230, the user-generated game play advice is available for viewing by other members of the gaming community. The members of the community may then act upon that advice during the course of game play.

The newly received and default ranked game play advice is also displayed in conjunction with previously received game play advice, which is also stored in game play advice database 120. The previously received game play advice may have been previously displayed and ranked or may be displayed for the first time with a default ranking (i.e., multiple instances of game play advice are being displayed for the first time). The newly received game play advice may also be displayed with pre-packaged game play advice from the game publisher.

A user acting upon any displayed game play advice may return to the system 100 and provide feedback as to the quality of that particular game play advice in step 240. The feedback may be provided via a prompt generated by feedback engine 160. The nature of the feedback may be like that described in the context of FIG. 1 with respect to feedback engine 160 (e.g., a number of 'stars' or 'thumbs up' or 'thumbs down' as well as appropriateness of the context in which the advice was rendered). Advice that resulted in better game play may receive a higher ranking than advice that resulted in lesser game play. The presentation of the game play advice may also affect the ranking. For example, if the advice was presented in such a way as to make the advice confusing notwithstanding the validity of the advice, the particular instance may receive a lesser ranking. This may be particularly appropriate with respect to the context in which the advice was provided.

After having received feedback in step 240, the ranking engine 130 of system 100 will rank the new game play advice against previously received (and possibly ranked) game play advice in step 250. Ranking of the new game play advice with respect to the previously received (and perhaps ranked) game play advice will take into account the feedback received by the feedback engine 160 and stored in feedback database 170. After having received an initial indication of quality based on user feedback, game play advice will lose its 'default' ranking and move up or down a ladder of all available game play advice based on its valuation against other game play advice. The context of the advice may also be re-evaluated such that the advice is assigned a new context for display in the future.

Following the ranking operation of step 250, the results of which may be stored in ranking database 180, a new context of a game event is identified in step 260. Identification step 260 occurs as a result of the joint operation of the context engine 140 and display engine 150 and may be similar to identification of an initial context of game play advice as occurs in the context of step 220 (but not otherwise displayed in FIG. 2). Upon a particular context being identified in an environment, then advice that is relevant to that particular context is identified. Game play advice and previously received game play advice will be (re)displayed by the game play advice display engine 150 in step 270. The (re)display of the game play advice will reflect any received user feedback from step 240 and the subsequent ranking operation and context re-evaluation of step 250. Based on the ranking operation of step 250, quality game play advice will rise to the top of a list of game play advice or be communicated to the community of users such that they know the advice that has received high approval from the community versus game play advice perceived to have little or no value.

The method 200 of FIG. 2 may operate in real-time (or substantially in real-time) using an asynchronous programming language such as Ajax. In an asynchronous language like Ajax, small amounts of data are continually exchanged with a database so that an entire user interface need not be reloaded in response to each user interaction. In such an embodiment, an XMLHttpRequest object may be utilized to fetch the most recent game play advice rankings from the ranking database 180 of FIG. 1. This ranking information, and the corresponding game play advice retrieved from game play advice database 120, may then be displayed via an interface generated by the game play advice display engine 150. Relationships between rankings, user feedback, context, and game play advice may be reflected by metadata or header data stored in the various databases of system 100. Game play advice rankings and context determinations may thus be updated as feedback is received and new rankings are calculated.

The method 200 of FIG. 2 may also operate subject to a predetermined schedule. For example, the ranking engine 130 may update the ranking database 180 at five minute intervals (or any other time period as may be determined by a system administrator). Similar updates may occur with respect to context. Once the ranking database 180 is updated as a result of a regularly scheduled ranking operation, the newly updated ranking information may be pushed to the game play advice display engine 150 for display to the community of users in conjunction with the game play advice retrieved from game play advice database 120. The updated ranking information in the ranking database 180 may also be available for access in response to a user request or query. A user request for ranking information may instantiate the ranking operation and the subsequent display of ranked game play advice.

Figure 3:
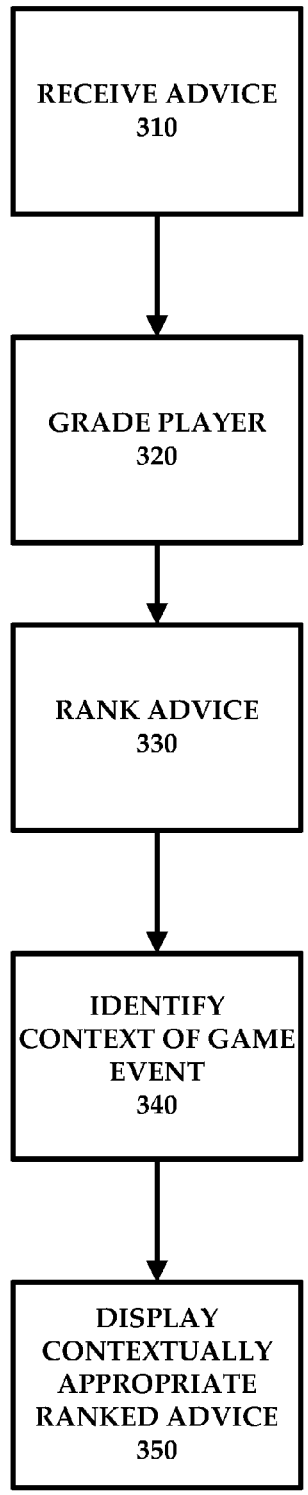
FIG. 3 illustrates an exemplary method for ranking user-generated and context appropriate game play advice based on the reputation of the user submitting the advice.

FIG. 3 illustrates an exemplary method 300 for ranking user-generated game and context appropriate play advice based on the reputation of the user submitting the advice. The steps identified in FIG. 3 (and the order thereof) are exemplary and may include various alternatives, combinations, equivalents, or derivations thereof including but not limited to the order of execution of the same. The steps of the process of FIG. 3 (and its various alternatives) may be embodied in hardware or software including a computer-readable storage medium (e.g., optical disc, memory card, or hard drive) including instructions executable by the processor of a computing device.

In step 310, user-generated game play advice is received at the system 100 from a user in a game community. Receipt of game play advice may occur through a user interface generated by the game play advice submission engine 110. The submitting user may be identified as part of the submission process. Identification may occur through manual entry of a screen name. Identification may also occur via a user profile accessed when the user logged into the gaming community. Context of the game play advice may also be considered upon entry.

Automated grading of the submitting user by the ranking engine 130 takes place in step 320 such that a determination as to the authority of the provided game play advice may be made. For example, if a user is playing a particular game for the first time, any advice proffered by that player is likely of little value due to that player's general inexperience with the game. If a user is experienced with respect to that game, however, then any advice provided by that user may be of greater value due to their vast experience with game play. Experience may be derived from game play statistics or other data, which may be associated with a user profile.

Alternatively, the submitting user may be graded based on their actual performance in a particular game. A particular user may play a game numerous times but lack any exceptional ability with respect to that particular game. In these instances, grading the user based on the number of times that they have played the game may be misleading. Grading the user based on performance in the game may be more indicative of the quality of the advice the user might offer.

User performance may be based on any variety of factors. For example, a user may be graded based on a score achieved, a level reached, or a length of the user existed in a particular game environment without being 'killed.' Performance may also be based on objectives completed, items obtained, weapons mastered, enemies killed, and so forth.

Once the user is graded in step 320, the ranking engine 130 will rank new game play advice against previously received (and perhaps ranked) game play advice in step 330. In some instances, feedback concerning appropriateness of context may be considered as a part of the ranking algorithm. After having received an initial indication of quality based on grading of the user and game context, game play advice will be ranked and that ranking information will be stored in ranking database 180 while the game play advice is stored in game play advice database 120. Information concerning appropriate context may also be maintained.

Following the ranking operation of step 330, the context of a game play event is identified in step 340. Context of game play may be identified by the context engine 140 as described above with respect to objects, events, tasks, enemies, and so forth. Following identification of an appropriate context, the new game play advice and previously received game play advice will be displayed in step 350 by the game play advice display engine 150 in a context appropriate manner. The display of the game play advice will reflect the grading of the user with respect to the game play advice as occurred in step 320 and the subsequent ranking operation of step 330, which may take into account prior indicia concerning context appropriateness. Based on the ranking operation of step 330, quality and context appropriate game play advice will rise to the top of a list of game play advice or be communicated to the community of users such that they know the advice was offered by a game player of exceptional ability versus having come from a user with little to no experience or ability.

The method 300 of FIG. 3 may operate in real-time or substantially in real-time. Like the method of FIG. 2 (200), such real-time functionality may be effectuated using an asynchronous programming language whereby the most recent game play advice rankings vis-à-vis a user grade are retrieved from the ranking database 180 and displayed via the game play advice display engine 150. In this matter, game play advice rankings are updated as user grading is calculated.

Like the method of FIG. 2 (200), the method of FIG. 3 (300) may also operate subject to a predetermined schedule whereby the ranking engine 130 updates the ranking database 180 at regular intervals. Context may be similarly updated and revised. Once the ranking database 180 is updated as a result of a regularly scheduled ranking operation, the newly updated ranking information may be pushed to the game play advice display engine 150 for display to the community of users in conjunction with the game play advice retrieved from game play advice database 120. Alternatively, the updated information in the ranking database 180 may available for access in response to a user request or query. A user request for ranking information may instantiate the ranking operation and the subsequent display of ranked game play advice.

User grading may also be in response to feedback received from the gaming community. In such an embodiment, user grading step 320 will involve feedback engine 160 calculating a community valuation of a particular user based on information retrieved from the feedback database 170 and prior ranking information retrieved from the ranking database 180. Steps 330 and 350 of the method 300 of FIG. 3 will proceed as described above with the exception that the ranking of game play advice is now based on user feedback rather than an automated determination made solely by ranking engine 130.

In a still further embodiment, the user grade may involve a weighting algorithm imposed by optional weighting engine 190. In such an embodiment, community feedback may be assigned a first weighting value by the weighting algorithm of weighting engine 190. The automated ranking generated by the ranking engine 130 may be allocated a second weighting value. These weighted values may proportionally affect a final ranking (also calculated by the ranking engine 130) that is ultimately stored in the ranking database 180 for retrieval by the game play advice display engine 150.

Figure 4:
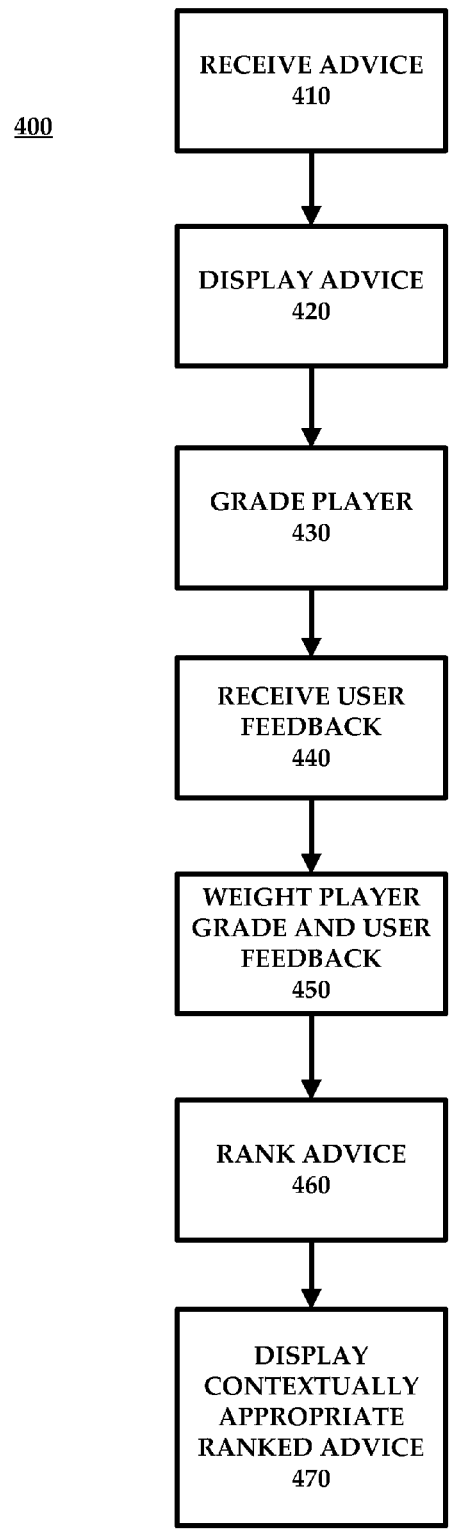
FIG. 4 illustrates an exemplary method for ranking user-generated and context appropriate game play advice based on the quality of the advice and the reputation of the user submitting the advice.

FIG. 4 illustrates an exemplary method 400 for ranking user-generated and context appropriate game play advice based on the quality of the advice and the reputation of the user submitting the advice. The steps identified in FIG. 4 (and the order thereof) are exemplary and may include various alternatives, combinations, equivalents, or derivations thereof including but not limited to the order of execution of the same. The steps of the process of FIG. 4 (and its various alternatives) may be embodied in hardware or software including a computer-readable storage medium (e.g., optical disc, memory card, or hard drive) including instructions executable by the processor of a computing device.

In step 410, user-generated game play advice is received at the system 100 from a user in a game community. Upon receipt of the user-generated game play advice in step 410, the advice is processed by the system 100 and assigned a default ranking. Game play advice may be initially received through an interface generated by the game play submission engine 110 and stored in the game play advice database 120. Allocation of a default ranking may be allocated by ranking engine 130. Initial determinations of context are also made.

The processed and default ranked game play advice is subsequently displayed by the game play advice display engine 150 in step 420. The game play advice display engine 150 retrieves the default ranking information from ranking database 180 and the game play advice from the game play advice database 120 in addition to certain determinations made by context engine 140. Upon display in step 420, the user-generated and context appropriate game play advice is available for viewing by other members of the gaming community who may then act upon that advice during the course of game play.

The newly received and default ranked game play advice may also be displayed in conjunction with previously received game play advice. The previously received game play advice may have been previously displayed (and ranked) or may be displayed for the first time with a default ranking. Display may take place concurrent with pre-packaged game play advice from the game developer, which may also be ranked.

In step 430, the submitting user is graded. Grading of the submitting user takes place such that a determination as to the authority of the game play advice provided may be made as was the case in FIG. 3. As was the case in FIG. 3, a user may be graded based on experience playing a particular game or performance with respect to a particular game. Grading may also be based on community feedback. Issues related to context appropriateness may also be considered.

In step 440, feedback as to the quality of particular game play advice, which may include the context appropriateness of the same, may be provided by users in the community via feedback engine 160. Advice that results in better game play may receive better feedback than advice that resulted in lesser game play or that was perhaps presented in such a way as to make the advice confusing and otherwise ineffective. Feedback may be stored in feedback database 170.

In step 450, the grading of the user as occurred in step 430 and the feedback provided with respect to particular game play advice as occurred in step 440 may be weighted. Weighting of the user grade and advice feedback may occur through optional weighting engine 190. As noted in the context of FIG. 1, the ratio of importance of the user grade versus the user feedback may be allocated as to best overall evaluate the advice provided by the user.

Following weighting of the user grade and the user feedback in step 450, the ranking engine 130 will rank the new game play advice against previously received game play advice in step 460. After having received an initial indication of quality based on user feedback and the user grade, game play advice will lose its 'default' ranking and move up or down a ladder of all available game play advice based on its valuation against other advice as a whole.

Following the ranking operation of step 460, the new game play advice and previously received game play advice will be (re)displayed in step 470 by game play advice display engine 150 in conjunction with determinations made by context engine 140. The (re) display of the game play advice will reflect the results of the ranking operation of step 460, which may be retrieved from ranking database 180 in conjunction with the actual game play advice from game play advice database 120. Based on the ranking operation of step 460, quality game play advice from knowledgeable game players will rise to the top of a list of game play advice or be communicated to the community of users such that they know the advice that has received a combination of high approval from the community and was offered by an otherwise experienced or well qualified game player.

FIG. 6A illustrates a particular game environment 600 with a display of contextually inappropriate game play advice 610. The game play advice 610 as displayed in the environment 600 may be quality game play advice. The game play advice may even be ranked. Notwithstanding, providing information related to weapon selection and a particular type of car to be driven later in the game are of absolutely no assistance to the user in the present context.

FIG. 6B illustrates the same game environment 600 of FIG. 6A but with contextually appropriate game play advice 620. In this instance, the game play advice is context appropriate in that it suggests multiple ways for a user to grab on to the rope or otherwise escape the present precarious situation. This information is timely and particularly relevant with respect to the user escaping this predicament.

While the present invention has been described with reference to exemplary embodiments, it will be understood by those skilled in the art that various changes may be made and equivalents may be substituted for elements thereof without departing from the true spirit and scope of the present invention. For example, the aforementioned system 100 and methods discussed therein (e.g., FIG. 2-4) may be utilized to receive submissions, rank, display, accept feedback, and (re) rank and (re)display various forms of information other than game play advice. For example, the present system and methods may be employed in the context of search engine results or queries for on-line audio and video content. The aforementioned system and methods may also be used with respect to (reverse) auctions and bidding based on valuation/feedback of a seller, vendor, and/or product.

In addition, modifications may be made without departing from the essential teachings of the present invention. Various alternative systems may be utilized to implement the various methodologies described herein and various methods may be used to achieve certain results from the aforementioned systems.

What is claimed is:

1. A computer-implemented method for managing user-generated game play advice, the method comprising:
   receiving new game play advice from a user through a user interface generated by a game play advice submission engine, the game play advice submission engine coupled to a server and executable by a processor; and
   executing instructions stored in a memory, in which execution of instructions by the processor:
   displays the new game play advice to a community of users, the new game play advice displayed in a default ranking position and in conjunction with previously received game play advice, the game play advice displayed in a manner that is relevant with respect to a present context of game play, the new game play advice displayed by a game play advice display engine that utilizes an asynchronous programming language;
   receives feedback associated with the quality of the new game play advice or the previously received game play advice, the feedback received from the community of users, the feedback received via a feedback engine generating a prompt that is displayed in an immediate context of the new game play advice or the previously received game play advice;
   ranks the new game play advice against the previously received game play advice based on the feedback received from the community of users; and displays the new game play advice in conjunction with the previously received game play advice via the game play advice display engine, the new game play advice and the previously received game play advice displayed in accordance with the ranking of the new game play advice and the previously received game play advice, wherein the new game play advice is no longer displayed in the default ranking position and the new game play advice is displayed in a manner that is relevant with respect to a present context of game play, the ranking allocated by a ranking engine.

2. The method of claim 1, wherein the feedback includes the relevance of the context in which the game play advice was displayed.

3. The method of claim 1, wherein the new game play advice is displayed in a three-dimensional virtual environment.

4. The method of claim 1, wherein the new game play advice is selected from a group consisting of textual, visual, and audible game play advice.

5. The method of claim 1, wherein the feedback is selected from a group consisting of numeric, characteristic, and binary feedback, the feedback including user commentary.

6. The method of claim 1, wherein ranking the new game play advice in a position that is not the default position occurs substantially in real-time.

7. The method of claim 1, wherein ranking the new game play advice in a position that is not the default position occurs according to a predetermined schedule.

8. The method of claim 1, wherein ranking the new game play advice in a position that is not the default position occurs in response to a user query.

9. A system embodied in a non-transitory, computer-readable storage medium for managing user-generated game play advice, the system comprising:
   a game play advice submission engine, coupled to a server and executable by a processor, to receive game play advice submissions over a network, the game play advice submissions received from a user through a user interface;
   a ranking engine, coupled to the server and executable by the processor, to allocate a ranking to the game play advice submissions received over the network;
   a context engine, coupled to the server and executable by the processor, to identify a context of an event during game play, wherein the context of the event corresponds to one or more game play advice submissions received over the network;
   a game play advice display engine, coupled to the server and executable by the processor, to display the one or more game play advice submissions corresponding to the context of the event identified by the context engine, wherein display of the one or more game play advice submissions occurs during the game play event and in accordance with the ranking allocated by the ranking engine, the one or more game play advice submissions displayed by the game play advice display engine utilizing an asynchronous programming language; and
   a feedback engine, coupled to the server and executable by the processor, to receive feedback from a community of users with respect to the quality of the game play advice displayed by the game play advice display engine, wherein the feedback engine and the ranking engine operate to allocate a new ranking to the game play advice in accordance with the feedback received from the community of users, the game play advice being subsequently displayed by the game play advice display engine in accordance with the new ranking, the feedback engine generating a prompt that is displayed in an immediate context of the new game play advice.

10. The system of claim 9, wherein the context engine matches the game play advice submissions to the context of the event based on an identification of the game play event.

11. The system of claim 9, wherein the game play advice display engine displays those game play advice submissions matched to the game play event by the context engine.

12. The system of claim 9, wherein the ranking allocated by the ranking engine is selected from a group consisting of numeric, characteristic, binary, and percentage-based rankings.

13. The system of claim 9, wherein the ranking engine is further configured to apply a tie-breaker to game play advice receiving an equal ranking from the ranking engine.

14. The system of claim 9, wherein the game play advice display engine operates using an asynchronous programming language to continually update the displayed game play advice submissions in accordance with a most recent new ranking as allocated by the feedback engine and the ranking engine.

15. The system of claim 9, wherein the game play advice display engine operates using an asynchronous programming language to continually update the displayed game play advice submissions in accordance with a most recent determination as to the context of game play.

16. The system of claim 9, wherein the game play advice display engine displays the game play advice submissions in accordance with a most recent new ranking as allocated by the feedback engine and the ranking engine according to a predetermined schedule.

* * * * *